United States Patent [19]

Fry

[11] 3,947,615
[45] Mar. 30, 1976

[54] PREPARATION OF MOULDING COMPOSITIONS

[75] Inventor: David Philip Fry, Glamorgan, Wales

[73] Assignee: BP Chemicals International Limited, London, England

[22] Filed: May 22, 1974

[21] Appl. No.: 472,366

[30] Foreign Application Priority Data
May 20, 1973  United Kingdom............. 25626/73

[52] U.S. Cl. ............... 427/398; 260/865; 427/374; 427/401; 428/290; 428/378; 428/392
[51] Int. Cl.² ........................................ C03C 25/02
[58] Field of Search............ 117/126 EB, 161K; 260/865; 428/378, 392, 290; 427/374, 398, 401

[56] References Cited
UNITED STATES PATENTS

| | | |
|---|---|---|
| 3,219,604 | 11/1965 | Fischer ............................ 260/865 |
| 3,288,735 | 11/1966 | Watanabe..................... 117/126 GB |
| 3,396,128 | 8/1968 | Matumoto.................... 117/126 GB |
| 3,536,642 | 10/1970 | Williger ............................. 260/865 |
| 3,539,479 | 11/1970 | Alberts .............................. 260/865 |
| 3,557,042 | 1/1971 | Dalhuisen ......................... 260/865 |
| 3,795,717 | 3/1974 | Vargin ............................... 260/865 |
| 3,846,164 | 4/1974 | Lagache ..................... 117/126 GB |

OTHER PUBLICATIONS

Chemical Abstracts, Vol. 58: 7043g, 1963.

*Primary Examiner*—Ralph Husack
*Assistant Examiner*—William H. Schmidt

[57] ABSTRACT

Sheet moulding compound (S.M.C.) is made by impregnating glass fibre with hot polyester resin matrix containing a soluble gelling agent, e.g. sodium or potassium stearate which causes the matrix to gel on cooling.

11 Claims, No Drawings

PREPARATION OF MOULDING COMPOSITIONS

The present invention relates to a process for the preparation of fibre reinforced unsaturated polyester resin based thermosetting moulding compounds.

Thermosetting usaturated polyester resin based moulding compounds are well known and consist essentially of an unsaturated polyester, an ethylenically unsaturated copolymerisable monomer, inert mineral fillers, fibrous reinforcing fillers and a catalyst which initiates the cross-linking reaction between the copolymerisable monomer and the unsaturated polyester resin at the chosen moulding temperature. They are commonly prepared and used in two physical forms, dough moulding compounds and sheet moulding compounds.

In dough, sometimes known as bulk, moulding compounds, the fibrous reinforcing filler is in the form of randomly dispersed short fibres, suitably of length about ¼" to 1". Until recently, dough moulding compounds were commonly prepared by charging all the components except the fibrous reinforcement to a batch mixer, such as a Z-blade mixer, mixing thoroughly and then adding the fibrous reinforcement in a chopped strand form and mixing for a further period of time sufficient to produce a homogeneous mixture without causing deleterious degredation of the fibres. Recently, processes have been devised for the continuous production of dough moulding compounds by placing all the components of the compound except the fibrous reinforcement in a bath, passing continuous filaments (rovings) of the fibrous reinforcement through the bath to coat them with the resin system, and subsequently chopping the coated filaments into short lengths. For convenience dough moulding compound made in this way will be referred to throughout this specification as rovings moulding compound (RMC).

In sheet moulding compounds (SMC), sometimes known as "Prepreg" (preimpregnated mat), the fibrous reinforcing filler is present either as a continuous filament mat, chopped strand mat or as chopped fibres deposited on a supporting carrier, the fibrous filler being impregnated with the unsaturated polyester resin system, giving rise to sheets of moulding compound in which the fibres have not been subjected to the degrading action of conventional moulding compound mixers.

To prepare SMC or RMC a polyester resin system of relatively low viscosity is required, in order to thoroughly wet out the fibrous reinforcement. However, such a resin system has the disadvantage that it gives a product which is sticky, making cutting and handling difficult. To overcome this problem, additives are included in the polyester resin system to bring about a viscosity increase, known as maturation, after impregnation. Typical additives used hitherto include the oxides and hydroxides of magnesium and calcium. These however, have the disadvantage that the viscosity build up is slow i.e. of the order of 24 hours or more, and tends to continue throughout the life of the SMC or RMC prior to moulding, until a point is reached where the SMC or RMC is too stiff to be of practical use. The use of these known additives has the further disadvantage in that variable maturation rates arise owing to batch to batch variability of the resin.

It is an object of the present invention to provide a process for the prepration of SMC or RMC in which the viscosity build up of the polyester resin system to the required level is achieved within a short period and does not continue up to a level where the SMC or RMC is too stiff to be commercially usable.

According to the present invention, a process for the preparation of an unsaturated polyester resin based SMC or RMC comprises heating a liquid unsaturated polyester resin system consisting essentially of an unsaturated polyester, a copolymerisable monomer, a polymerisation initiator and a gelling agent for the said unsaturated polyester resin system to an elevated temperature below that at which cross linking of the system occurs, impregnating a fibrous reinforcement with the said hot liquid unsaturated polyester resin system and subsequently cooling the resultant moulding compound to a temperature at which the liquid unsaturated polyester resin system and gelling agent form a gel.

Unsaturated polyesters for use in SMC or RMC are well known. See for example, British patent specification No. 1,098,132. The preferred unsaturated polyesters for use in the process of the present invention are those which have a relatively high hot rigidity in the thermoset state, so that any reduction of rigidity due to the presence of modifying agents is offset. Examples of such unsaturated polyesters are those in which more than 50 molar percent of their acidic residues are derived from maleic or fumaric acids. Examples are polypropylene glycol maleate or fumarate, or such unsaturated polyester with a minor proportion of the maleic or fumaric residues replaced by isophthalic or carbic acid residues. Also suitable are unsaturated polyesters containing more than 50 molar percent of maleic and fumaric acid residues and alcohol residues derived from the Bisphenol A adducts of ethylene oxide or propylene oxide. Further suitable unsaturated polyesters are those in which a minor proportion of the maleic or fumaric acid residues are replaced by chloro-acid residues such as tetra-chlorophthalic or chlorendic acid residues.

The copolymerisable monomer is suitably a liquid monomer having $\alpha,\beta$-ethylenic unsaturation for example styrene, vinyl toluene and diallyl phthalate. Some solid copolymerisable monomers, for example, triallyl cyanurate, can also be used in conjunction with a liquid monomer. The amount of copolymerisable monomer used is suitably in the range from 20 to 60% by weight and preferably from 40 to 50% by weight based on the total weight of the unsaturated polyester and copolymerisable monomer.

By gelling agent is meant throughout this specification an agent which is soluble in the unsaturated polyester/copolymerisable monomer mixture at an elevated temperature and which when the solution is cooled to ambient temperatures, e.g. below 30°C, promotes the formation of a high viscosity gel. Whether or not a compound is a gelling agent according to the present invention can readily be determined by the following simple procedure:

Take from 0.5 to 3 grams of compound and mix with 30 parts of the unsaturated polyester/copolymerisable monomer mixture while warming gently to a maximum of 90°C until a substantially clear solution is obtained. Then cool the solution to ambient temperature, i.e. at least below 30°C, and check if gel formation occurs. This may be done by having the solution in a 1 inch diameter glass test tube, inverting it when cooled and noting whether the mixture remains as a stable gel in the upper portion.

Examples of compounds that can form suitable gelling agents with different unsaturated polyester resin systems are sodium stearate and potassium stearate. Such materials have been found to be soluble in unsaturated polyester/copolymerisable monomer mixture at elevated temperatures of the order of 50° to 70°C.

The time taken for substantial solution of a gelling agent in an unsaturated polyester resin system to occur and the temperature at which it is easy to achieve substantial solution are dependent on a number of factors. Firstly, we have found that the greater the concentration of polar groups in the polyester resin system, the easier it is to obtain solution and the firmer the resultant gel obtained on cooling. It is therefore advantageous to add small amounts e.g. from 0.5 to 3% by weight of polar materials to the polyester resin system to improve the ease of solution and gel strength. Examples of such materials include hydroxy ethyl acrylate, stearamide and polyethylene glycols, the amount added in any example being dependent on the concentration of the polar groups already present in the unsaturated polyester/copolymerisable monomer mixture and the required final gel strength.

Secondly, we have found that finely divided gelling agents are more readily dissolved than agents in other solid physical forms and therefore it is preferred that the gelling agent is added in a finely divided form.

Suitable polymerization initiators for use in the process of the present invention are those known for use in thermosetting unsaturated polyester resin based moulding compounds. It is an essential feature of the present invention that the initiator used has a decomposition temperature that is higher than the temperature required to obtain substantial solution of the gelling agent in the unsaturated polyester/copolymerisable monomer mixture, i.e., the chosen initiator must not initiate and sustain the vinyl polymerisation process at a significant level as this would result in the crosslinking of the unsaturated polyester and copolymerisable monomer at the temperature used for dissolving the gelling agent. They preferably have a decomposition temperature above 75°C and include benzoyl peroxide, methyl ethyl ketone peroxide, t-butyl hydroperoxide, t-butyl perbenzoate and di-t-butyl peroxide. The amount of peroxidic initiator used is suitably in the range 0.1 to 5.0% by weight based on the total weight of the unsaturated polyester/copolymerisable monomer mixture. Also suitable as initiators are the azo compounds which meet the decomposition temperature requirements. Examples include $2,2^1$-azobis-(2,4-dimethyl valeronitrile), $2,2^1$ azobis (2,4,4-trimethyl valeronitrile), $2,2^1$-azobis-(2,4-dimethyl- 4-methoxy valeronitrile), $1,1^1$-azobis-(cyclo-octane carbonitrile), $2,2^1$ azobis (isobutyronitrile) and azo-1-cyanocyclohexane. The quantity of azo compound used is suitably in the range of 0.05 to 2.0% by weight, based on the total weight of the unsaturated polyester and the copolymerisable monomer.

Suitably the liquid unsaturated polyester resin system constitutes from 20 to 40 wt % and preferably from 25–35 wt % of the total weight of the SMC or RMC prepared by the process of the present invention.

The fibrous reinforcement in the production of SMC is suitably present in the form of a continuous mat or as random fibres. Such fibrous reinforcing materials are well known in the art. The preferred fibrous reinforcing material is glass fibre. When used in the production of SMC glass fibre is suitably either in mat form based on chopped strands or continuous filaments, or in the form of loose chopped strands. Suitably the SMC or RMC of the present invention contain from 5 to 40% by weight of fibrous reinforcement and preferably from 15 to 35% by weight of glass fibrous reinforcement based on the total weight of the SMC or RMC.

The unsaturated polyester resin system for use in the process of the present invention may contain a mineral filler. Suitable mineral fillers for use in the SMC or RMC are those well known in the art for use in unsaturated polyester moulding compositions. The filler may consist entirely of a bulking filler, for example calcium carbonate, alumina, calcium sulphate, blanc fixe and clays, or may include additionally pigment, for example titanium dioxide and fire retarding agents for example chlorinated paraffins, pentabromotoluene and antimony oxide. The total weight of such fillers used in the SMC or RMC of the present invention is suitably in the range 20 to 50% by weight and preferably in the range 30 to 40% by weight, based on the total weight of the SMC or RMC.

In a preferred aspect of the present invention, a part of the inorganic filler is replaced by a modifier system to control shrinkage on moulding. Such modifiers are known for use in thermosetting unsaturated polyester resin moulding compositions. By way of example, thermoplastic polymers, e.g. polystyrene, polyethylene, polyvinyl chloride, polyvinylacetate and polyacrylates and methacrylates when added to the compositions in an amount up to about 15% by weight of the total composition greatly reduce the mould shrinkage and such compositions are known as "low-shrink" compositions. In a particularly preferred aspect of the present invention the modifier system comprises a combination of a saturated liquid polyester to prevent shrinkage and a thermoplastic polymer to prevent exudaton of the saturated liquid polyester on moulding. Such a system enables mouldings having zero mould shrinkage or even an expansion when compared with the dimensions of the cold mould to be obtained and such compositions are known as "non-shrink" compositions. They are described in our British patent specification Nos. 1,098,132 and 1,250,631. Suitable saturated liquid polyesters for use in such systems include polypropylene adipate and polypropylene sebacate used at concentrations in the range 1 to 20% by weight and preferably 3 to 10% by weight on the total composition and suitable thermoplastics include polyvinyl chloride, polyethylene, cellulose acetate butyrate, polycaprolactones, polyacrylates, polymethacrylates and polystyrene used in an amount sufficient to prevent exudation of the saturated liquid polyester, suitable quantities being in the range 5 to 45% by weight and preferably 20 to 30% by weight of the quantity of saturated liquid polyester, although larger quantities can be used without deleterious effect.

While the above systems for preventing shrinkage of the SMC or RMC on moulding are effective in the process of the present invention we have found that when the SMC and RMC is prepared by the method disclosed herein, a saturated polyester can be used as the shrinkage control additive without the joint use of a thermoplastic polymer to prevent exudation on moulding.

According to a further aspect of the present invention there is provided an unsaturated polyester resin system for the preparation of SMC or RMC which comprises an unsaturated polyester, a copolymerisable monomer, a polymerisation initiator, a saturated liquid polyester and a gelling agent for the said unsaturated polyester resin system as hereinbefore defined.

The above system, optionally including the aforementioned polar materials, is capable of being used to produce SMC or RMC which has non-shrink characteristics, and thus gives mouldings of exceptional dimensional stability and surface finish.

The polyester resin systems for use in the process of the present invention suitably further contain a vinyl polymerisation inhibitor to prevent the premature polymerisation of the system. Lubricants and mould release agents are generally present in the compositions in minor quantities.

In the process of the present invention SMC may be prepared by passing a glass fibre mat through the unsaturated polyester resin system which is heated to and maintained at an elevated temperature, interleaving the wetted mat between polyethylene or cellulose films and passing it through compression rolls to effect impregnation of the glass by the resin mix. Further kneading and compression may be carried out by ribbed rollers if required.

Alternatively, the SMC may be prepared by coating layers of the polyester resin system at an elevated temperature onto two separate polyethylene or cellulose films, applying glass fibres produced by chopping glass rovings onto the unsaturated polyester resin system before bringing the films together to form a composite and passing this composite through compression rollers to effect impregnation of the glass by the unsaturated polyester resin system.

In the process of the present invention RMC may be prepared by passing continuous glass fibre rovings through a bath containing the unsaturated polyester resin system which is heated to and maintained at an elevated temperature and subsequently chopping the coated rovings into short lengths.

Any other method suitable for the impregnation of fibrous reinforcement with a liquid unsaturated polyester resin system to form SMC or RMC may be used in the process of the present invention.

The unsaturated polyester resin system can be heated to the temperature necessary to dissolve the gelling agent by any suitable means. In practice, it has been found that the temperature rise brought about by high shear mixing of the constituents of the system is often sufficient to bring about the solution of the gelling agent.

The unsaturated polyester resin system and the SMC and RMC formed therefrom should be maintained at an elevated temperature sufficient to prevent gelation until the fibrous reinforcement is thoroughly wetted by the unsaturated polyester resin system.

After the SMC or RMC is formed gelation is preferably induced by allowing the SMC or RMC to cool at ambient or lower temperatures. We have found that gelation starts to occur at around 40°C when sodium stearate is used as the gelling agent with a typical unsaturated polyester resin system. When sufficiently cooled the SMC or RMC is ready for use as a moulding compound without further storage or treatment.

The SMC or RMC prepared by the process of the present invention has the advantage that because the whole unsaturated polyester resin system is gelled, the exudation of resin components on storage is minimised. Further, the use of a warm unsaturated polyester resin system to impregnate the fibrous reinforcement gives an SMC or RMC in which the fibres have been more thoroughly wetted by the resin system, leading to the preparation of improved moulded articles from the SMC or RMC.

The process of the present invention is further illustrated with reference to the following Example.

EXAMPLE 1.

A preliminary test using 2 grams of sodium stearate in 30 grams of an unsaturated polyester resin system had shown that sodium stearate was a gelling agent.

An unsaturated polyester resin composition was prepared from the following components:

| | |
|---|---|
| Unsaturated polyester resin (polypropylene maleate; 60 wt % soln. in styrene) | 25.0 p.b.w. |
| Hexaplas PPA (ICI Ltd. polypropylene adipate) | 4.0 p.b.w. |
| Polyethylene glycol 4000 (E.J.R. Lovelock) | 2.0 p.b.w. |
| Trigonox X33 (Novadel Ltd.) mixed perester catalyst | 0.5 p.b.w. |
| Zelec NE (Dupont Ltd.) release agent | 0.5 p.b.w. |
| Butylated hydroxy toluene inhibitor | 0.1 p.b.w. |
| Inorganic filler (Microdol Extra - Norwegian Talc Ltd.) | 65.9 p.b.w. |
| Stearamide | 1.0 p.b.w. |
| Sodium Stearate "F" (Witco Chemicals) — gelling agent | 1.0 p.b.w. |

PROCESS

All components, with the exception of the filler were charged to a high shear dispersion mixer (Torrance). Mixing was carried out adding the filler slowly until a homogeneous paste was formed, allowing the temperature to rise to 70°C.

The paste, maintained at a temperature of between 55°–65°C, was used to impregnate two layers of 1½ ounce per foot square chopped glass strand mat of glass strand length of 2 inches on a Sheet Moulding Compound machine. An SMC, having a glass content of 25%, was thus produced. When cooled to ambient temperature, about 20°C, the polyethylene film could be cleanly peeled from the composition. A number of plies of this material were stacked together and placed in a heated matched metal mould a 140°C and subjected to pressure for 3 minutes. A moulding was produced of high gloss, free from surface ripple, and exhibiting nil shrink properties.

After 4 weeks storage at 20°C no change in stiffness of the material was observed. Moreover, no change in moulding performance was noted on moulding after 4 weeks storage at 20°C. A further sample of sheet was examined after storage for over a year and was found to be still soft and pliable and satisfactory for moulding under normal conditions of temperature and pressure.

EXAMPLE 2.

A series of materials were tested as hereinbefore described for gelling properties by heating 2 grams of the material with 30 grams of the unsaturated polyester/styrene mixture used in Example 1, until solution occurred. The tubes containing the solutions were allowed to cool to ambient temperature (about 20°C) and then inverted and the strength of the gel examined and any flow noted.

| Material | Comments on test solutions | |
|---|---|---|
| | Gel form | Flow properties |
| Sodium laurate | Very weak. | Rapid flow. |
| Sodium myristate | Weak. | Slow flow — one minute to flow down tube. |
| Sodium palmitate | Fairly firm. | No flow in five minutes. |
| Sodium stearate | Strong. | No flow. |
| Sodium behenate | Strong. | No flow. |
| Sodium hydroxystearate | Strong. | No flow. |

From these tests it is clear that the sodium salts of palmitic behenic and hydroxystearic acids are gelling agents according to the present invention and are capable of giving similar SMC to that of Example 1 which used sodium stearate as agent.

I claim:

1. A process for the preparation of an unsaturated polyester resin based sheet or rovings moulding compound, consisting essentially of the steps of heating a liquid unsaturated polyester resin system consisting essentially of an unsaturated polyester, a copolymerisable monomer, a polymerisation initiator and a gelling agent for said unsaturated polyester resin system to an elevated temperature at which the unsaturated resin system does not form a gel but below that at which cross linking of the system occurs, said gelling agent being soluble in said mixture of unsaturated polyester and copolymerisable monomer at said elevated temperature and being capable of initiating formation of a high viscosity gel when said solution is cooled from said elevated temperature to below 30°C., impregnating a fibrous reinforcement with said liquid unsaturated polyester resin system while said resin system is at said elevated temperature, and subsequently cooling the resultant moulding compound to a temperature at which the liquid unsaturated polyester resin system forms a gel.

2. A process as claimed in claim 1, wherein the gelling agent is sodium or potassium stearate.

3. A process as claimed in claim 1, wherein the liquid unsaturated polyester resin system is heated to a temperature in the range 50° to 70°C.

4. A process as claimed in claim 1, wherein the liquid unsaturated polyester resin system contains a small amount of a polar material.

5. A process as claimed in claim 1, wherein the polymerisation initiator has a decomposition temperature above 75°C.

6. A process as claimed in claim 1, wherein the fibrous reinforcement is glass fibre in the form of a mat.

7. A process as claimed in claim 1 wherein the fibrous reinforcement is glass fibre in the form of loose chopped strands or rovings.

8. A process as claimed in claim 1, wherein the liquid unsaturated polyester resin system contains a saturated liquid polyester as shrink control agent.

9. A process according to claim 1, wherein said gelling agent is selected from the group consisting of the sodium salts of palmitic, stearic, behenic and hydroxy stearic acids and the potassium salt of stearic acid.

10. A process for the preparation of an unsaturated polyester resin based sheet or rovings moulding compound, consisting essentially of the steps of heating a liquid unsaturated polyester resin system consisting essentially of an unsaturated polyester, a copolymerisable monomer, a polymerisation initiator and a gelling agent for said unsaturated polyester resin system to an elevated temperature at which the unsaturated resin system does not form a gel in the range of from 50° to 70°C. but below that at which cross linking of the system occurs, said gelling agent being soluble in said mixture of unsaturated polyester and copolymerisable monomer at said elevated temperature and being capable of initiating formation of a high viscosity gel when said solution is cooled from said elevated temperature to below 30°C., impregnating a fibrous reinforcement with said liquid unsaturated polyester resin system while said resin system is at said elevated temperature, and subsequently cooling the resultant moulding compound to a temperature below 40°C. at which the liquid unsaturated polyester resin system forms a gel.

11. A process according to claim 10, wherein said gelling agent is selected from the group consisting of the sodium salts of palmitic, stearic, behenic and hydroxy stearic acids and the potassium salt of stearic acid.

* * * * *